(12) United States Patent
Tanaka et al.

(10) Patent No.: US 11,407,047 B2
(45) Date of Patent: Aug. 9, 2022

(54) REAMER

(71) Applicant: A.L.M.T. Corp., Tokyo (JP)

(72) Inventors: Sakuya Tanaka, Kato (JP); Koji Sawa, Kato (JP)

(73) Assignee: A.L.M.T. Corp., Tokyo (JP)

( * ) Notice: Subject to any disclaimer, the term of this patent is extended or adjusted under 35 U.S.C. 154(b) by 0 days.

(21) Appl. No.: 16/973,612

(22) PCT Filed: Apr. 3, 2019

(86) PCT No.: PCT/JP2019/014773
§ 371 (c)(1),
(2) Date: Dec. 9, 2020

(87) PCT Pub. No.: WO2020/003680
PCT Pub. Date: Jan. 2, 2020

(65) Prior Publication Data
US 2021/0245277 A1      Aug. 12, 2021

(30) Foreign Application Priority Data

Jun. 28, 2018   (JP) ............................. JP2018-123496

(51) Int. Cl.
*B23D 77/02*          (2006.01)

(52) U.S. Cl.
CPC .......... *B23D 77/02* (2013.01); *B23D 2277/04* (2013.01); *B23D 2277/105* (2013.01); *B23D 2277/62* (2013.01)

(58) Field of Classification Search
CPC ............... B23D 77/02; B23D 2277/62; B23D 2277/105
See application file for complete search history.

(56) References Cited

U.S. PATENT DOCUMENTS

| | | | | |
|---|---|---|---|---|
| 6,033,159 A | * | 3/2000 | Kress | B23D 77/02 408/199 |
| 6,269,893 B1 | * | 8/2001 | Beaton | E21B 10/26 175/391 |
| 6,379,090 B1 | * | 4/2002 | Halley | B23D 77/003 408/227 |
| 9,163,460 B2 | * | 10/2015 | Isenhour | E21B 7/28 |
| 9,271,740 B2 | * | 3/2016 | Scianamblo | A61B 17/1635 |
| 10,857,606 B2 | * | 12/2020 | Kress | B23D 77/00 |
| 10,926,344 B2 | * | 2/2021 | Sasagawa | B23D 77/12 |
| 2015/0151373 A1 | * | 6/2015 | Dejaune | B23D 77/04 408/81 |

(Continued)

FOREIGN PATENT DOCUMENTS

| | | | | |
|---|---|---|---|---|
| CN | 202344044 U | | 7/2012 | |
| GB | 1208127 A | * | 10/1970 | ............. E21B 10/30 |

(Continued)

*Primary Examiner* — Eric A. Gates
(74) *Attorney, Agent, or Firm* — Baker Botts L.L.P.; Michael A. Sartori

(57) ABSTRACT

A reamer includes a core, a plurality of outer-circumference cutting edges provided on an outer circumference of the core and made of a hard tool material, and a margin provided on a rear side of each the plurality of outer-circumference cutting edges in a rotational direction. A distance from an axis of rotation to a position of a center of gravity of the reamer is greater than 0.01 mm and not greater than 0.5 mm.

2 Claims, 3 Drawing Sheets

(56) References Cited

U.S. PATENT DOCUMENTS

| | | | |
|---|---|---|---|
| 2018/0243841 A1 | 8/2018 | Nakanohara | |
| 2021/0245276 A1* | 8/2021 | Tanaka | B23D 77/00 |

FOREIGN PATENT DOCUMENTS

| | | |
|---|---|---|
| JP | 2001-079706 A | 3/2001 |
| JP | 2005-022064 A | 1/2005 |
| JP | 2005-193349 A | 7/2005 |
| JP | 2006-088242 A | 4/2006 |
| JP | 2010-125532 A | 6/2010 |
| JP | 2011-062790 A | 3/2011 |
| JP | 2016-032863 A | 3/2016 |
| JP | 2017-052081 A | 3/2017 |
| JP | 2017-087373 A | 5/2017 |
| JP | 2019-063977 A | 4/2019 |

\* cited by examiner

REAMER

TECHNICAL FIELD

The present invention relates to reamers. The present application claims a priority based on Japanese Patent Application No. 2018-123496 filed on Jun. 28, 2018, the entire contents of which are incorporated herein by reference.

BACKGROUND ART

Reamers have conventionally been disclosed in PTL 1 (Japanese Patent Laying-Open No. 2006-88242), PTL 2 (Japanese Patent Laying-Open No. 2011-62790), and PTL 3 (Japanese Patent Laying-Open No. 2016-32863).

CITATION LIST

Patent Literature

PTL 1: Japanese Patent Laying-Open No. 2006-88242
PTL 2: Japanese Patent Laying-Open No. 2011-62790
PTL 3: Japanese Patent Laying-Open No. 2016-32863

SUMMARY OF INVENTION

A reamer according to an aspect of the present invention includes a core, a plurality of outer-circumference cutting edges provided on an outer circumference of the core and made of a hard tool material, and a margin provided on a rear side of each of the plurality of outer-circumference cutting edges in a rotational direction, wherein a distance from an axis of rotation to a position of a center of gravity of the reamer is greater than 0.01 mm and not greater than 0.5 mm.

DESCRIPTION OF EMBODIMENTS

[Problem to be Solved by the Present Disclosure]
A conventional reamer may fail to reduce surface roughness of a workpiece.
The present invention has been made to solve the above problem, and therefore has an object to provide a reamer capable of reducing surface roughness of a workpiece.
[Effects of the Present Disclosure]
The present invention can provide a reamer capable of reducing surface roughness of a workpiece.
[Description of Embodiments the Present Invention]
First, embodiments of the present invention are listed and described.
A reamer according to an aspect of the present invention includes a core, a plurality of outer-circumference cutting edges provided on an outer circumference of the core and made of a hard tool material, and a margin provided on a rear side of each of the plurality of outer-circumference cutting edges in a rotational direction, wherein a distance from an axis of rotation to a position of a center of gravity of the reamer is greater than 0.01 mm and not greater than 0.5 mm.

It is commonly considered that a tool having a better rotational balance, that is, a smaller amount of eccentricity (a smaller distance from an axis of rotation to a position of the center of gravity of the reamer) is more preferable. In contrast, the inventors of the present invention have focused on the surface roughness of a workpiece to find out that the surface roughness of the workpiece can be reduced by increasing an amount of eccentricity. The theory as to why the surface roughness of the workpiece decreases as an amount of eccentricity is increased is not necessarily clear, but the following assumption is made.

As an amount of eccentricity exceeds 0.01 mm, the burnishing effect owing to the margin increases, and the surface roughness of the surface of the workpiece decreases. In other words, with an amount of eccentricity not greater than 0.01 mm, the burnishing effect owing to the margin is small. With an amount of eccentricity greater than 0.5 mm, the centrifugal force varies greatly, and the surface roughness of the workpiece increases greatly.

Preferably, a width of the margin in the rotational direction is not less than 0.05 mm and less than 0.5 mm, and a surface roughness Ra (JIS B 0601-2001) of the margin is not less than 0.05 µm and less than 0.4 µm. In this case, the burnishing effect owing to the margin is greatest, and the surface roughness of the workpiece is small.

Preferably, an angle between a plurality of the outer-circumference cutting edges differs, and a difference in the angle is greater than 20°. When an angle between the plurality of outer-circumference cutting edges differs, the plurality of cutting edges are disposed on the circumference at irregular intervals. When a difference in the angle exceeds 20°, the burnishing effect further increases.

Figure 1:
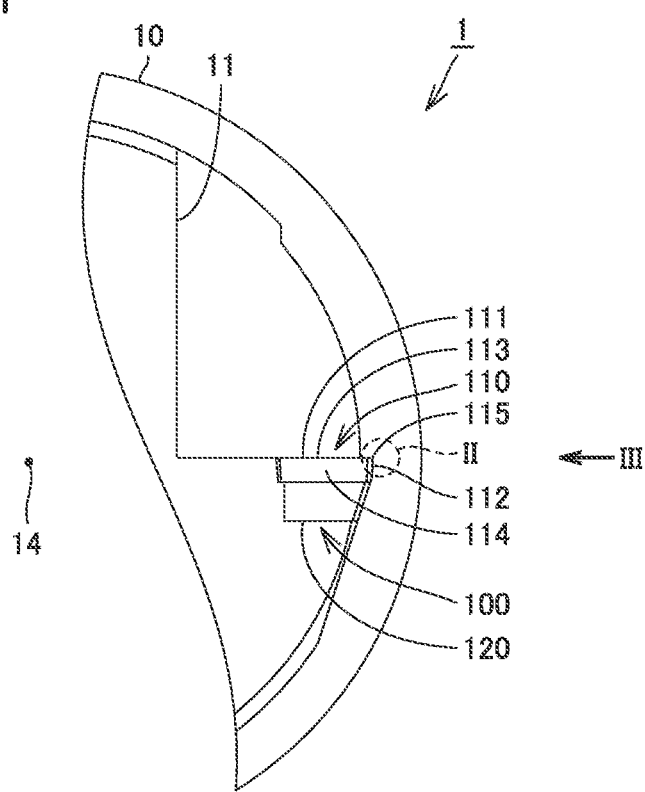
FIG. 1 is a front view of a reamer according to an embodiment.
Figure 2:
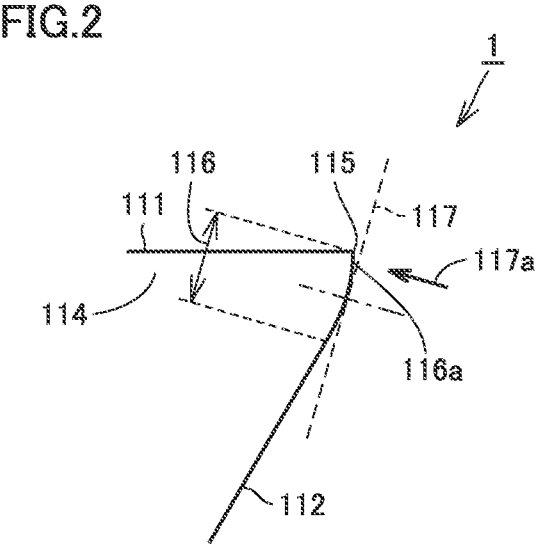
FIG. 2 is an enlarged view of a portion circled by II in FIG. 1.
Figure 3:
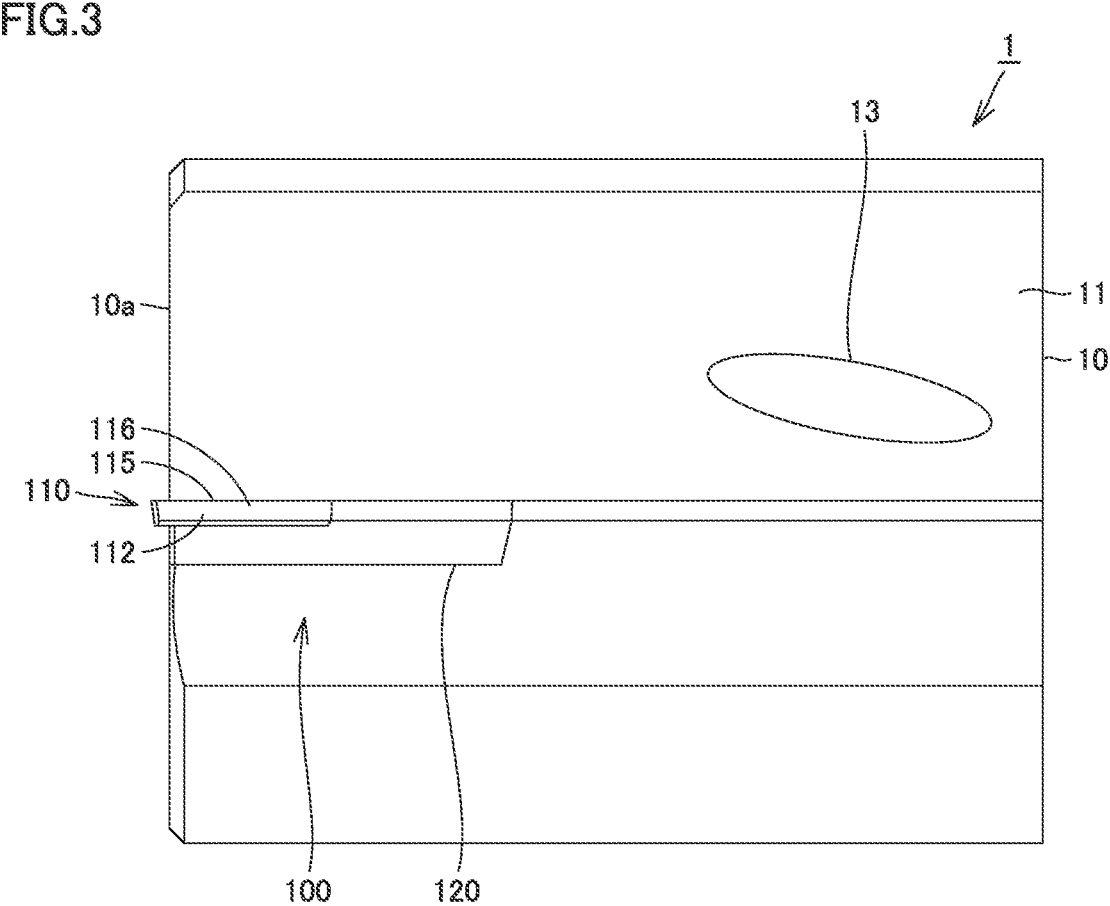
FIG. 3 is a lateral view of the reamer as viewed from the direction indicated by the arrow III in FIG. 1.

FIG. 1 is a front view of a reamer according to an embodiment. FIG. 2 is an enlarged view of a portion circled by II in FIG. 1. FIG. 3 is a lateral view of the reamer as viewed from the direction indicated by the arrow III in FIG. 1.

As shown in FIGS. 1 to 3, a reamer 1 as a rotary cutting tool according to an embodiment has a core 10.

Core 10 extends in the longitudinally. An insert 100 is provided at the front end portion of core 10. Core 10 is provided with a flute 11 running in the longitudinally. Insert 100 is disposed in flute 11.

Core 10 is made of, for example, a cemented carbide. Insert 100 is fixed to core 10 by brazing. Although insert 100 is directly fixed to core 10 in the present embodiment, insert 100 may be fixed to a platform by brazing, and the platform may be fixed to core 10 by brazing or with a bolt.

Insert 100 is composed of a hard tool insert 110, which is made of single crystal diamond synthesized through chemical vapor deposition (CVD), and a platform 120, which serves as a base holding hard tool insert 110. Hard tool insert 110 is made of a hard tool material such as polycrystalline diamond or cubic boron nitride (CBN), not limited to single crystal diamond.

Core 10 is provided with a cutting oil passage. The cutting oil passage runs inside core 10 in the longitudinally of core 10 and is connected to a hole 13 for supplying cutting oil to a contact interface between hard tool insert 110 and the workpiece.

In the present embodiment, a plurality of inserts 100 (not shown) are provided in core 10. Inserts 100 are provided on the same circumferential track. Alternatively, inserts 100 may be provided in core 10 over multiple stages axially of core 10.

Insert 100 has an outer-circumference cutting edge 115 and a front cutting edge 113, which is continuous with outer-circumference cutting edge 115. A cutting edge corner is formed between outer-circumference cutting edge 115 and front cutting edge 113. A portion surrounded by outer-circumference cutting edge 115 and front cutting edge 113 is a rake face 111.

In the present embodiment, front cutting edge 113 runs substantially orthogonal to outer-circumference cutting edge 115. However, front cutting edge 113 may have an angle of inclination relative to outer-circumference cutting edge 115. The angle of inclination is an angle formed by front cutting edge 113 relative to the radial direction.

When hard tool insert 110 is made of single crystal diamond, hard tool insert 110 is made of single crystal diamond synthesized through CVD or single crystal diamond through direct synthesis on high temperature, high pressure conditions. Hard tool insert 110 is fixed onto platform 120 made of cemented carbide.

A margin 116 and an outer-circumference flank face 112 are formed so as to run along outer-circumference cutting edge 115. Margin 116 is a portion that contacts the workpiece in rotary cutting, and outer-circumference flank face 112 is a portion that does not contact the workpiece in rotary cutting. Referring to FIG. 2, margin 116 is composed of hard tool insert 110 alone. However, margin 116 may be composed of hard tool insert 110 and platform 120. In this case, the width of margin 116 in the rotational direction is larger than the width of hard tool insert 110 in the rotational direction. A front flank face 114 is formed along front cutting edge 113. Outer-circumference flank face 112 is formed not only at hard tool insert 110 but also at platform 120 made of cemented carbide.

Reamer 1 includes core 10 and hard tool insert 110 provided on the outer circumference of core 10, and hard tool insert 110 has outer-circumference cutting edge 115 and margin 116 provided on the rear side in the rotational direction of outer-circumference cutting edge 115.

Margin 116 has a curved surface shape. A ridge 116a is formed so as to run in a direction different from those of outer-circumference cutting edge 115 and front cutting edge 113 along margin 116 from a cutting edge corner that is a point of intersection between outer-circumference cutting edge 115 and front cutting edge 113.

Front cutting edge 113 projects from a front end 10a of core 10. Front cutting edge 113 may not project from front end 10a. A wedge angle (an angle formed between rake face 111 and outer-circumference flank face 112, front flank face 114) not less than 70°, at which front cutting edge 113 and outer-circumference cutting edge 115 have a large strength, is preferable.

An amount of eccentricity is measured as follows. First, a reamer is attached to a high-accuracy tool balancer. An example of the high-accuracy tool balancer is Tool Dynamic TD Comfort available from HAIMER.

When the reamer is rotated, a figure of imbalance is displayed. For example, 14.3 gmm is displayed. The mass of the reamer is measured. For example, it is assumed that the reamer has a mass of 200 g. An amount of eccentricity can be obtained by dividing the amount of imbalance by the mass of a tool. In the above example, the amount of eccentricity is 14.3 gmm/200 g=0.0715 mm.

Method of Measuring Width of Margin in Rotational Direction

As shown in FIG. 2, since margin 116 is a curved surface portion between outer-circumference cutting edge 115 and outer-circumference flank face 112, a distance in the rotational direction from outer-circumference cutting edge 115 to outer-circumference flank face 112, which is a zero-curvature plane (non-curved surface), is measured.

Measurement of Surface Roughness of Margin 116

A surface roughness Ra of margin 116 is measured in accordance with JIS B 0601: 2001 with, for example, Surftest SV-3200 available from Mitutoyo Corporation.

Example 1

Core 10 was made of cemented carbide, and hard tool insert 110 was made of polycrystalline diamond (PCD), thereby producing reamers shown in Table 1. An amount of eccentricity of the reamer was adjusted by the following method. The reamer in which hard tool insert 110 having the cutting edge was fixed to core 10 was attached to the high-accuracy tool balancer, and an amount of eccentricity was calculated as described above. When there is a difference between the calculated amount of eccentricity and a set value of the amount of eccentricity, the amount of eccentricity was adjusted by removing a portion of core 10, which is located between the terminal end opposite to front end 10a of core 10 and the terminal end of flute 11 opposite to front end 10a of core 10. The removal of part of core 10 as described above and the calculation of an amount of eccentricity of the reamer were alternately repeated, thereby producing a reamer with an amount of eccentricity set to the set value. The thus produced reamer was used to conduct cutting evaluations on the following conditions.

Cutting Conditions

Workpiece: aluminum alloy ADC12
Number of rotations: 8000 rpm for a tool diameter of ϕ 8 mm; 5300 rpm for ϕ 15 mm; 2200 rpm for ϕ 43 mm
Feed rate: 0.3 mm/rev
Removal amount: 0.6 mm
Processed depth: 12 mm
Coolant: water-soluble

TABLE 1

Surface roughness Rz (μm) of processed workpiece

| | Sample No. | Tool diameter mm | Number of blades Pieces | Angle between adjacent cutting edges ° | Maximum phase difference ° | Amount of eccentricity mm | Margin width mm | Margin surface roughness Ra μm | Surface roughness Rz of processed workpiece μm |
|---|---|---|---|---|---|---|---|---|---|
| Comparative Example | 1 | ϕ8 | 3 | 120, 120, 120 | 0 | 0.009 | 0.54 | 0.33 | B |
| Comparative Example | 2 | ϕ8 | 3 | 120, 120, 120 | 0 | 0.010 | 0.54 | 0.33 | B |
| Example | 3 | ϕ8 | 3 | 120, 120, 120 | 0 | 0.012 | 0.54 | 0.33 | A |
| Example | 4 | ϕ8 | 3 | 120, 120, 120 | 0 | 0.102 | 0.54 | 0.33 | A |
| Example | 5 | ϕ8 | 3 | 120, 120, 120 | 0 | 0.304 | 0.54 | 0.33 | A |

TABLE 1-continued

Surface roughness Rz (μm) of processed workpiece

| | Sample No. | Tool diameter mm | Number of blades Pieces | Angle between adjacent cutting edges ° | Maximum phase difference ° | Amount of eccentricity mm | Margin width mm | Margin surface roughness Ra μm | Surface roughness Rz of processed workpiece μm |
|---|---|---|---|---|---|---|---|---|---|
| Example | 6 | φ8 | 3 | 120, 120, 120 | 0 | 0.450 | 0.54 | 0.33 | A |
| Example | 7 | φ8 | 3 | 120, 120, 120 | 0 | 0.500 | 0.54 | 0.33 | A |
| Comparative Example | 8 | φ8 | 3 | 120, 120, 120 | 0 | 0.550 | 0.54 | 0.33 | B |
| Comparative Example | 9 | φ15 | 5 | 72, 72, 72, 72, 72 | 0 | 0.008 | 0.54 | 0.33 | B |
| Example | 10 | φ15 | 5 | 72, 72, 72, 72, 72 | 0 | 0.012 | 0.54 | 0.33 | A |
| Example | 11 | φ15 | 5 | 72, 72, 72, 72, 72 | 0 | 0.125 | 0.54 | 0.33 | A |
| Example | 12 | φ15 | 5 | 72, 72, 72, 72, 72 | 0 | 0.352 | 0.54 | 0.33 | A |
| Example | 13 | φ15 | 5 | 72, 72, 72, 72, 72 | 0 | 0.492 | 0.54 | 0.33 | A |
| Comparative Example | 14 | φ15 | 5 | 72, 72, 72, 72, 72 | 0 | 0.541 | 0.54 | 0.33 | B |
| Comparative Example | 15 | φ43 | 4 | 90, 90, 90, 90 | 0 | 0.005 | 0.54 | 0.33 | B |
| Example | 16 | φ43 | 4 | 90, 90, 90, 90 | 0 | 0.013 | 0.54 | 0.33 | A |
| Example | 17 | φ43 | 4 | 90, 90, 90, 90 | 0 | 0.078 | 0.54 | 0.33 | A |
| Example | 18 | φ43 | 4 | 90, 90, 90, 90 | 0 | 0.189 | 0.54 | 0.33 | A |
| Example | 19 | φ43 | 4 | 90, 90, 90, 90 | 0 | 0.389 | 0.54 | 0.33 | A |
| Example | 20 | φ43 | 4 | 90, 90, 90, 90 | 0 | 0.495 | 0.54 | 0.33 | A |
| Comparative Example | 21 | φ43 | 4 | 90, 90, 90, 90 | 0 | 0.525 | 0.54 | 0.33 | B |

AAA = not less than 0.1 and less than 1.6, AA = not less than 1.6 and less than 2.4, A = not less than 2.4 and less than 3.2, B = not less than 3.2 and less than 6.3

Table 1 shows that the samples with an amount of eccentricity not greater than 0.01 mm and the samples with an amount of eccentricity greater than 0.5 mm have a large surface roughness Rz (JIS-B 0601: 2001) of the processed workpiece, and accordingly, are rated B.

Example 2

Core 10 was made of cemented carbide, and hard tool insert 110 was made of polycrystalline diamond (PCD), thereby producing reamers shown in Table 2. Cutting evaluations were conducted on the following conditions.

Cutting Conditions
Workpiece: aluminum alloy AC4B
Number of rotations: 6000 rpm for tool diameter of φ 11 mm; 3000 rpm for φ 20 mm
Feed rate: 0.25 mm/rev
Removal amount: 0.5 mm
Processed depth: 15 mm
Coolant: water-soluble

TABLE 2

Surface roughness Rz (μm) of processed workpiece

| | Sample No. | Tool diameter mm | Number of blades Pieces | Angle between adjacent cutting edges ° | Maximum phase difference ° | Amount of eccentricity mm | Margin width mm | Margin surface roughness Ra μm | Surface roughness Rz of processed workpiece μm |
|---|---|---|---|---|---|---|---|---|---|
| Example | 22 | φ11 | 4 | 90, 90, 90, 90 | 0 | 0.070 | 0.04 | 0.23 | A |
| Example | 23 | φ11 | 4 | 90, 90, 90, 90 | 0 | 0.070 | 0.05 | 0.23 | AA |
| Example | 24 | φ11 | 4 | 90, 90, 90, 90 | 0 | 0.070 | 0.1 | 0.23 | AA |
| Example | 25 | φ11 | 4 | 90, 90, 90, 90 | 0 | 0.070 | 0.3 | 0.23 | AA |
| Example | 26 | φ11 | 4 | 90, 90, 90, 90 | 0 | 0.070 | 0.49 | 0.23 | AA |
| Example | 27 | φ11 | 4 | 90, 90, 90, 90 | 0 | 0.070 | 0.51 | 0.23 | A |
| Example | 28 | φ11 | 4 | 90, 90, 90, 90 | 0 | 0.070 | 0.55 | 0.23 | A |
| Example | 29 | φ20 | 5 | 72, 72, 72, 72, 72 | 0 | 0.062 | 0.28 | 0.009 | A |
| Example | 30 | φ20 | 5 | 72, 72, 72, 72, 72 | 0 | 0.062 | 0.28 | 0.01 | AA |
| Example | 31 | φ20 | 5 | 72, 72, 72, 72, 72 | 0 | 0.062 | 0.28 | 0.1 | AA |
| Example | 32 | φ20 | 5 | 72, 72, 72, 72, 72 | 0 | 0.062 | 0.28 | 0.2 | AA |
| Example | 33 | φ20 | 5 | 72, 72, 72, 72, 72 | 0 | 0.062 | 0.28 | 0.25 | AA |
| Example | 34 | φ20 | 5 | 72, 72, 72, 72, 72 | 0 | 0.062 | 0.28 | 0.29 | AA |
| Example | 35 | φ20 | 5 | 72, 72, 72, 72, 72 | 0 | 0.062 | 0.28 | 0.31 | A |

AAA = not less than 0.1 and less than 1.6, AA = not less than 1.6 and less than 2.4, A = not less than 2.4 and less than 3.2, B = not less than 3.2 and less than 6.3

Table 2 above shows that the surface pressure is appropriately high and the burnishing effect is high with a margin width not less than 0.05 mm and less than 0.5 mm.

With a surface roughness Ra of the margin not less than 0.01 μm and less than 0.3 μm, a frictional force acts appropriately, the burnishing effect is high, and accordingly, excellent surface roughness is obtained.

Example 3

Core 10 was made of cemented carbide, and hard tool insert 110 was made of polycrystalline diamond (PCD), thereby producing reamers shown in Table 3. Cutting evaluations were conducted on the following conditions.

Cutting Conditions

Workpiece: aluminum alloy AC4C

Number of rotations: 4500 rpm for tool diameter of φ 14 mm; 2800 rpm for φ 30 mm Feed rate: 0.28 mm/rev Removal amount: 0.8 mm Processed depth: 14 mm Coolant: water-soluble

TABLE 3

Surface roughness Rz (μm) of processed workpiece

| | Sample No. | Tool diameter mm | Number of blades Pieces | Angle between adjacent cutting edges ° | Maximum phase difference ° | Amount of eccentricity mm | Margin width mm | Margin surface roughness Ra μm | Surface roughness Rz of processed workpiece μm |
|---|---|---|---|---|---|---|---|---|---|
| Example | 36 | φ14 | 5 | 65, 70, 70, 75, 80 | 15 | 0.065 | 0.22 | 0.24 | AA |
| Example | 37 | φ14 | 5 | 60, 68, 70, 77, 80 | 20 | 0.065 | 0.22 | 0.24 | AA |
| Example | 38 | φ14 | 5 | 60, 65, 70, 75, 90 | 25 | 0.065 | 0.22 | 0.24 | AAA |
| Example | 39 | φ14 | 5 | 60, 60, 65, 85, 90 | 30 | 0.065 | 0.22 | 0.24 | AAA |
| Example | 40 | φ15 | 4 | 83, 87, 92, 98 | 15 | 0.053 | 0.32 | 0.18 | AA |
| Example | 41 | φ15 | 4 | 80, 90, 90, 100 | 20 | 0.087 | 0.32 | 0.18 | AA |
| Example | 42 | φ15 | 4 | 80, 85, 90, 105 | 25 | 0.125 | 0.32 | 0.18 | AAA |
| Example | 43 | φ15 | 4 | 75, 85, 95, 105 | 30 | 0.352 | 0.32 | 0.18 | AAA |

AAA = not less than 0.1 and less than 1.6, AA = not less than 1.6 and less than 2.4, A = not less than 2.4 and less than 3.2, B = not less than 3.2 and less than 6.3

As shown in Table 3, in the case of unevenly spaced cutting edges, the vibration suppression effect acts, leading to improved surface roughness. Particularly in the case where even one phase difference is not less than 20°, the vibration suppression effect is high.

Example 4

Core 10 was made of cemented carbide, and hard tool insert 110 was made of polycrystalline CBN sintered body (PcBN), thereby producing reamers shown in Table 4. Cutting evaluations were conducted on the following conditions.

Cutting Conditions

Workpiece: gray cast iron FC250

Number of rotations: 7000 rpm for tool diameter of φ 9 mm; 3600 rpm for φ 18 mm; 1600 rpm for φ 41 mm Feed rate: 0.28 mm/rev Removal amount: 0.5 mm Processed depth: 18 mm Coolant: water-soluble

TABLE 4

Surface roughness Rz (μm) of processed workpiece

| | Sample No. | Tool diameter mm | Number of blades Pieces | Angle between adjacent cutting edges ° | Maximum phase difference ° | Amount of eccentricity mm | Margin width mm | Margin surface roughness Ra μm | Surface roughness Rz of processed workpiece μm |
|---|---|---|---|---|---|---|---|---|---|
| Comparative example | 101 | φ9 | 3 | 120, 120, 120 | 0 | 0.004 | 0.53 | 0.32 | B |
| Comparative example | 102 | φ9 | 3 | 120, 120, 120 | 0 | 0.010 | 0.53 | 0.32 | B |
| Example | 103 | φ9 | 3 | 120, 120, 120 | 0 | 0.011 | 0.53 | 0.32 | A |

TABLE 4-continued

Surface roughness Rz (μm) of processed workpiece

|  | Sample No. | Tool diameter mm | Number of blades Pieces | Angle between adjacent cutting edges ° | Maximum phase difference ° | Amount of eccentricity mm | Margin width mm | Margin surface roughness Ra μm | Surface roughness Rz of processed workpiece μm |
|---|---|---|---|---|---|---|---|---|---|
| Example | 104 | φ9 | 3 | 120, 120, 120 | 0 | 0.124 | 0.53 | 0.32 | A |
| Example | 105 | φ9 | 3 | 120, 120, 120 | 0 | 0.385 | 0.53 | 0.32 | A |
| Example | 106 | φ9 | 3 | 120, 120, 120 | 0 | 0.460 | 0.53 | 0.32 | A |
| Example | 107 | φ9 | 3 | 120, 120, 120 | 0 | 0.500 | 0.53 | 0.32 | A |
| Comparative example | 108 | φ9 | 3 | 120, 120, 120 | 0 | 0.535 | 0.53 | 0.32 | B |
| Comparative example | 109 | φ18 | 5 | 72, 72, 72, 72, 72 | 0 | 0.009 | 0.53 | 0.32 | B |
| Example | 110 | φ18 | 5 | 72, 72, 72, 72, 72 | 0 | 0.012 | 0.53 | 0.32 | A |
| Example | 111 | φ18 | 5 | 72, 72, 72, 72, 72 | 0 | 0.180 | 0.53 | 0.32 | A |
| Example | 112 | φ18 | 5 | 72, 72, 72, 72, 72 | 0 | 0.323 | 0.53 | 0.32 | A |
| Example | 113 | φ18 | 5 | 72, 72, 72, 72, 72 | 0 | 0.498 | 0.53 | 0.32 | A |
| Comparative example | 114 | φ18 | 5 | 72, 72, 72, 72, 72 | 0 | 0.550 | 0.53 | 0.32 | B |
| Comparative example | 115 | φ41 | 4 | 90, 90, 90, 90 | 0 | 0.007 | 0.53 | 0.32 | B |
| Example | 116 | φ41 | 4 | 90, 90, 90, 90 | 0 | 0.013 | 0.53 | 0.32 | A |
| Example | 117 | φ41 | 4 | 90, 90, 90, 90 | 0 | 0.095 | 0.53 | 0.32 | A |
| Example | 118 | φ41 | 4 | 90, 90, 90, 90 | 0 | 0.227 | 0.53 | 0.32 | A |
| Example | 119 | φ41 | 4 | 90, 90, 90, 90 | 0 | 0.374 | 0.53 | 0.32 | A |
| Example | 120 | φ41 | 4 | 90, 90, 90,90 | 0 | 0.496 | 0.53 | 0.32 | A |
| Comparative example | 121 | φ41 | 4 | 90, 90, 90, 90 | 0 | 0.538 | 0.53 | 0.32 | B |

AAA = not less than 0.1 and less than 1.6, AA = not less than 1.6 and less than 2.4, A = not less than 2.4 and less than 3.2, B = not less than 3.2 and less than 6.3

Table 4 shows that the samples with an amount of eccentricity not greater than 0.01 mm and the samples with an amount of eccentricity greater than 0.5 mm have a large surface roughness Rz of the processed workpiece, and accordingly, are rated B.

Example 5

Core 10 was made of cemented carbide, and hard tool insert 110 was made of polycrystalline CBN (PcBN), thereby producing reamers shown in Table 5. Cutting evaluations were conducted on the following conditions.

Cutting Conditions
Workpiece: sintered alloy F-08C2 (code of ISO5755 material specifications) Number of rotations: 5000 rpm for tool diameter of φ 13 mm; 3000 rpm for φ 23 mm
Feed rate: 0.26 mm/rev
Removal amount: 0.5 mm
Processed depth: 20 mm
Coolant: water-soluble

TABLE 5

Surface roughness Rz (μm) of processed workpiece

|  | Sample No. | Tool diameter mm | Number of blades Pieces | Angle between adjacent cutting edges ° | Maximum phase difference ° | Amount of eccentricity mm | Margin width mm | Margin surface roughness Ra μm | Surface roughness Rz of processed workpiece μm |
|---|---|---|---|---|---|---|---|---|---|
| Example | 122 | φ13 | 4 | 90, 90, 90, 90 | 0 | 0.086 | 0.045 | 0.21 | A |
| Example | 123 | φ13 | 4 | 90, 90, 90, 90 | 0 | 0.086 | 0.051 | 0.21 | AA |
| Example | 124 | φ13 | 4 | 90, 90, 90, 90 | 0 | 0.086 | 0.158 | 0.21 | AA |
| Example | 125 | φ13 | 4 | 90, 90, 90, 90 | 0 | 0.086 | 0.342 | 0.21 | AA |
| Example | 126 | φ13 | 4 | 90, 90, 90, 90 | 0 | 0.086 | 0.493 | 0.21 | AA |
| Example | 127 | φ13 | 4 | 90, 90, 90, 90 | 0 | 0.086 | 0.511 | 0.21 | A |
| Example | 128 | φ13 | 4 | 90, 90, 90, 90 | 0 | 0.086 | 0.556 | 0.21 | A |
| Example | 129 | φ23 | 5 | 72, 72, 72, 72, 72 | 0 | 0.102 | 0.225 | 0.008 | A |
| Example | 130 | φ23 | 5 | 72, 72, 72, 72, 72 | 0 | 0.102 | 0.225 | 0.012 | AA |
| Example | 131 | φ23 | 5 | 72, 72, 72, 72, 72 | 0 | 0.102 | 0.225 | 0.156 | AA |
| Example | 132 | φ23 | 5 | 72, 72, 72, 72, 72 | 0 | 0.102 | 0.225 | 0.223 | AA |

TABLE 5-continued

Surface roughness Rz (μm) of processed workpiece

| Sample No. | Tool diameter mm | Number of blades Pieces | Angle between adjacent cutting edges ° | Maximum phase difference ° | Amount of eccentricity mm | Margin width mm | Margin surface roughness Ra μm | Surface roughness Rz of processed workpiece μm |
|---|---|---|---|---|---|---|---|---|
| Example 133 | φ23 | 5 | 72, 72, 72, 72, 72 | 0 | 0.102 | 0.225 | 0.269 | AA |
| Example 134 | φ23 | 5 | 72, 72, 72, 72, 72 | 0 | 0.102 | 0.225 | 0.292 | AA |
| Example 135 | φ23 | 5 | 72, 72, 72, 72, 72 | 0 | 0.102 | 0.225 | 0.313 | A |

AAA = not less than 0.1 and less than 1.6, AA = not less than 1.6 and less than 2.4, A = not less than 2.4 and less than 3.2, B = not less than 3.2 and less than 6.3

Table 5 above shows that the surface pressure is appropriately high and the burnishing effect is high with a margin width not less than 0.05 mm and less than 0.5 mm.

With a surface roughness Ra of the margin not less than 0.01 μm and less than 0.3 μm, a frictional force acts appropriately, the burnishing effect is high, and accordingly, excellent surface roughness is obtained.

Example 6

Core 10 was made of cemented carbide, and hard tool insert 110 was made of polycrystalline CBN (PcBN), thereby producing reamers shown in Table 6. Cutting evaluations were conducted on the following conditions.

Cutting Conditions
Workpiece: ductile cast iron FCD450
Number of rotations: 4000 rpm for tool diameter of φ 15 mm; 2000 rpm for φ 32 mm
Feed rate: 0.30 mm/rev
Removal amount: 0.7 mm
Processed depth: 18 mm
Coolant: water-soluble

TABLE 6

Surface roughness Rz (μm) of processed workpiece

| Sample No. | Tool diameter mm | Number of blades Pieces | Angle between adjacent cutting edges ° | Maximum phase difference ° | Amount of eccentricity mm | Margin width mm | Margin surface roughness Ra μm | Surface roughness Rz of processed workpiece μm |
|---|---|---|---|---|---|---|---|---|
| Example 136 | φ15 | 5 | 65, 70, 70, 75, 80 | 15 | 0.073 | 0.22 | 0.22 | AA |
| Example 137 | φ15 | 5 | 60, 68, 70, 77, 80 | 20 | 0.073 | 0.22 | 0.22 | AA |
| Example 138 | φ15 | 5 | 60, 65, 70, 75, 90 | 25 | 0.073 | 0.22 | 0.22 | AAA |
| Example 139 | φ15 | 5 | 60, 60, 65, 85, 90 | 30 | 0.073 | 0.22 | 0.22 | AAA |
| Example 140 | φ32 | 4 | 83, 87, 92, 98 | 15 | 0.054 | 0.32 | 0.19 | AA |
| Example 141 | φ32 | 4 | 80, 90, 90, 100 | 20 | 0.072 | 0.32 | 0.19 | AA |
| Example 142 | φ32 | 4 | 80, 85, 90, 105 | 25 | 0.065 | 0.32 | 0.19 | AAA |
| Example 143 | φ32 | 4 | 75, 85, 95, 105 | 30 | 0.082 | 0.32 | 0.19 | AAA |

AAA = not less than 0.1 and less than 1.6, AA = not less than 1.6 and less than 2.4, A = not less than 2.4 and less than 3.2, B = not less than 3.2 and less than 6.3

As shown in Table 6, in the case of unevenly spaced cutting edges, the vibration suppression effect acts, leading to improved surface roughness. Particularly in the case where even one phase difference is not less than 20°, the vibration suppression effect is high.

It should be understood that the embodiments and examples disclosed herein are illustrative and non-restrictive in every respect. The scope of the present invention is defined by the terms of the claims, rather than the embodiments and examples above, and is intended to include any modifications within the scope and meaning equivalent to the terms of the claims.

REFERENCE SIGNS LIST 1 reamer, 10 core, 10a front end, 11 flute, 13 hole, 100 insert, 110 hard tool insert, 111 rake face, 112 outer-circumference flank face, 113 front cutting edge, 114 front flank face, 115 outer-circumference cutting edge, 116 margin, 116a ridge, 120 platform.

The invention claimed is:
1. A reamer comprising:
a core made of a cemented carbide;
a plurality of outer-circumference cutting edges provided on an outer circumference of the core and made of a hard tool material; and
a margin provided on a rear side of each of the plurality of outer-circumference cutting edges in a rotational direction,
wherein a distance from an axis of rotation to a position of a center of gravity of the reamer is greater than 0.01 mm and not greater than 0.5 mm,
a width of the margin in the rotational direction is not less than 0.05 mm and less than 0.5 mm, and a surface roughness Ra of the margin is not less than 0.01 μm and less than 0.3 μm,
a number of the plurality of outer-circumference cutting edges is 3 or more and 5 or less, and a tool diameter of the reamer is 8 mm or more and 43 mm or less.

2. The reamer according to claim 1, wherein an angle between two of the plurality of outer-circumference cutting edges differs from a second angle between a different set of two of the plurality of outer-circumference cutting edges, and a difference between these angles is greater than 20°.

* * * * *